United States Patent
Lin et al.

(10) Patent No.: US 8,582,324 B2
(45) Date of Patent: Nov. 12, 2013

(54) PULSE WIDTH MODULATION CONTROLLER AND METHOD FOR OUTPUT RIPPLE REDUCTION OF A JITTERING FREQUENCY SWITCHING POWER SUPPLY

(75) Inventors: Kun-Yu Lin, Pingtung County (TW); Tzu-Chen Lin, Taipei (TW); Pei-Lun Huang, Hsinchu County (TW)

(73) Assignee: Richpower Microelectronics Corporation, Grand Cayman, British West Indies (KY)

( * ) Notice: Subject to any disclaimer, the term of this patent is extended or adjusted under 35 U.S.C. 154(b) by 0 days.

(21) Appl. No.: 13/361,412

(22) Filed: Jan. 30, 2012

(65) Prior Publication Data

US 2012/0194162 A1    Aug. 2, 2012

(30) Foreign Application Priority Data

Feb. 1, 2011   (TW) .............................. 100103910 A

(51) Int. Cl.
*H02M 1/12*   (2006.01)
*H02M 3/335*  (2006.01)

(52) U.S. Cl.
USPC ................. 363/21.12; 363/21.15; 363/21.16; 363/21.17; 363/21.18; 363/39; 363/40; 363/41

(58) Field of Classification Search
USPC .......... 363/21.12, 21.15, 21.16, 21.17, 21.18, 363/39, 40, 41
See application file for complete search history.

(56) References Cited

U.S. PATENT DOCUMENTS

| | | | | |
|---|---|---|---|---|
| 6,107,851 A * | 8/2000 | Balakirshnan et al. | ........ | 327/172 |
| 6,218,820 B1 * | 4/2001 | D'Arrigo et al. | ............. | 323/285 |
| 6,249,876 B1 * | 6/2001 | Balakrishnan et al. | ........ | 713/501 |
| 6,839,247 B1 * | 1/2005 | Yang et al. | ................. | 363/21.11 |
| 7,026,851 B2 * | 4/2006 | Yang et al. | ................... | 327/172 |
| 7,184,283 B2 * | 2/2007 | Yang et al. | ...................... | 363/41 |
| 7,358,821 B2 * | 4/2008 | Chia | ............................... | 331/78 |
| 7,577,002 B2 * | 8/2009 | Yang | ................................. | 363/1 |
| 7,701,305 B2 * | 4/2010 | Lin et al. | ........................ | 331/143 |
| 7,961,481 B2 * | 6/2011 | Chu et al. | ........................ | 363/20 |
| 8,040,117 B2 * | 10/2011 | Telefus | ........................ | 323/271 |
| 8,194,425 B2 * | 6/2012 | Park et al. | ................... | 363/21.18 |
| 8,289,733 B2 * | 10/2012 | Gong et al. | ................. | 363/21.18 |
| 8,368,370 B2 * | 2/2013 | Morrish | ........................ | 323/282 |
| 2007/0103137 A1 * | 5/2007 | Yang | ............................ | 323/284 |
| 2007/0132440 A1 * | 6/2007 | Yang | ............................ | 323/304 |
| 2007/0133234 A1 * | 6/2007 | Huynh et al. | ................... | 363/20 |

* cited by examiner

*Primary Examiner* — Bao Q Vu
(74) *Attorney, Agent, or Firm* — Muncy, Geissler, Olds & Lowe, PLLC

(57) ABSTRACT

A pulse width modulation controller and method for output ripple reduction of a jittering frequency switching power supply detect the current of a power switch of the switching power supply to generate a current sense signal, and adjust the gain or the level of the current sense signal according to the switching frequency of the power switch to adjust the on time of the power switch, to reduce the output ripple of the switching power supply caused by the jittering frequency of the switching power supply.

5 Claims, 6 Drawing Sheets

PULSE WIDTH MODULATION CONTROLLER AND METHOD FOR OUTPUT RIPPLE REDUCTION OF A JITTERING FREQUENCY SWITCHING POWER SUPPLY

FIELD OF THE INVENTION

The present invention is related generally to a switching power supply and, more particularly, to a circuit and method for output ripple reduction of a jittering frequency switching power supply.

BACKGROUND OF THE INVENTION

Pulse width modulation (PWM) has been extensively applied to various electronic devices. For example, PWM controllers are used in switching power supplies to modulate duty cycles or switching frequencies of power switches and thereby modulate output voltages.

Recently, due to energy shortages and the increasing awareness of environmental protection, the energy saving feature of switching power supplies has drawn more and more attention. At the same time, laws and regulations were passed to impose stricter requirements on the power conversion efficiency of switching power supplies at light load and in standby mode. When a switching power supply is working at light load or in standby mode, the switching loss of its power switches accounts for a significant proportion of the overall power consumption. To increase the light loading and standby power conversion efficiency of switching power supplies, some power management integrated circuits (ICs) on the market are designed to lower the switching frequencies of power switches so that switching loss can be significantly reduced. Moreover, switching power supplies, though advantageously more compact than conventional linear power supplies, have another problem that electro-magnetic interference (EMI) caused by the switching elements. Jittering frequency technique is typically used to improve EMI problem in existing power management ICs. Numerous jittering frequency techniques have been proposed, such as U.S. Pat. No. 7,701,305, whose operation principles are not detailed herein.

Switching power supplies have a variety of types. For example, the switching power supply shown in FIG. 1 has a flyback configuration in which a PWM controller 10 switches a power switch M1 according to voltages at the pins COMP and CS to control the output power of the flyback power supply. The power switch M1 is connected in series to the primary side coil of a transformer 12, and a current sense resistor Rcs is serially connected to the power switch M1 to detect the current of the power switch M1 to generate a current sense signal Vcs supplied to the pin CS of the PWM controller 10. A photo-coupler 14 and a shunt regulator 16 establish an isolated feedback circuit, the shunt regulator 16 detects the output voltage V0 of the flyback power supply to control the feedback current Icomp on the pin COMP of the PWM controller 10, and based on the feedback current Icomp, a circuit in the PWM controller 10 generates a feedback voltage Vcomp at the pin COMP. The feedback voltage Vcomp is proportional to the output voltage V0. The flyback power supply shown in FIG. 1 provides the output power $$Po = \eta \times Vin^2 \times Ton^2 / (2 \times Lp \times T) \qquad [\text{Eq-1}]$$
$$= \eta \times Vin^2 \times Ton^2 \times fs / (2 \times Lp),$$

where $\eta$ is the conversion efficiency of the transformer 12, Vin is the primary side input voltage of the transformer 12, Ton is the on-time of the power switch M1, Lp is the magnetizing inductance of the transformer 12, T is the switching period of the power switch M1, and fs is the switching frequency of the power switch M1. If the PWM controller 10 uses a jittering frequency technique, the switching frequency fs will jitter. As shown by the equation Eq-1, jittering of the switching frequency fs causes variation in the output power Po to generate a low-frequency ripple at the output Vo of the flyback power supply, resulting in excessive output ripple.

In order to solve the excessive output ripple problem caused by jittering frequency, U.S. Pat. No. 7,026,851 generates an adjust current proportional to the jittering frequency to adjust the feedback voltage Vcomp. However, the level of the feedback voltage Vcomp at light load is different from that at heavy load; the constant proportional adjust current may lead to overcompensation at light load.

SUMMARY OF THE INVENTION

An objective of the present invention is to provide a pulse width modulation controller and method for reducing an output ripple caused by a jittering frequency of a switching power supply.

According to the present invention, a PWM controller and method for output ripple reduction of a jittering frequency switching power supply extract a current sense signal related to a current of a power switch of the switching power supply, and adjust a gain or the level of the current sense signal according to the switching frequency of the power switch to adjust the on-time of the power switch. Consequently, the output ripple caused by the jittering frequency of the switching power supply is improved.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
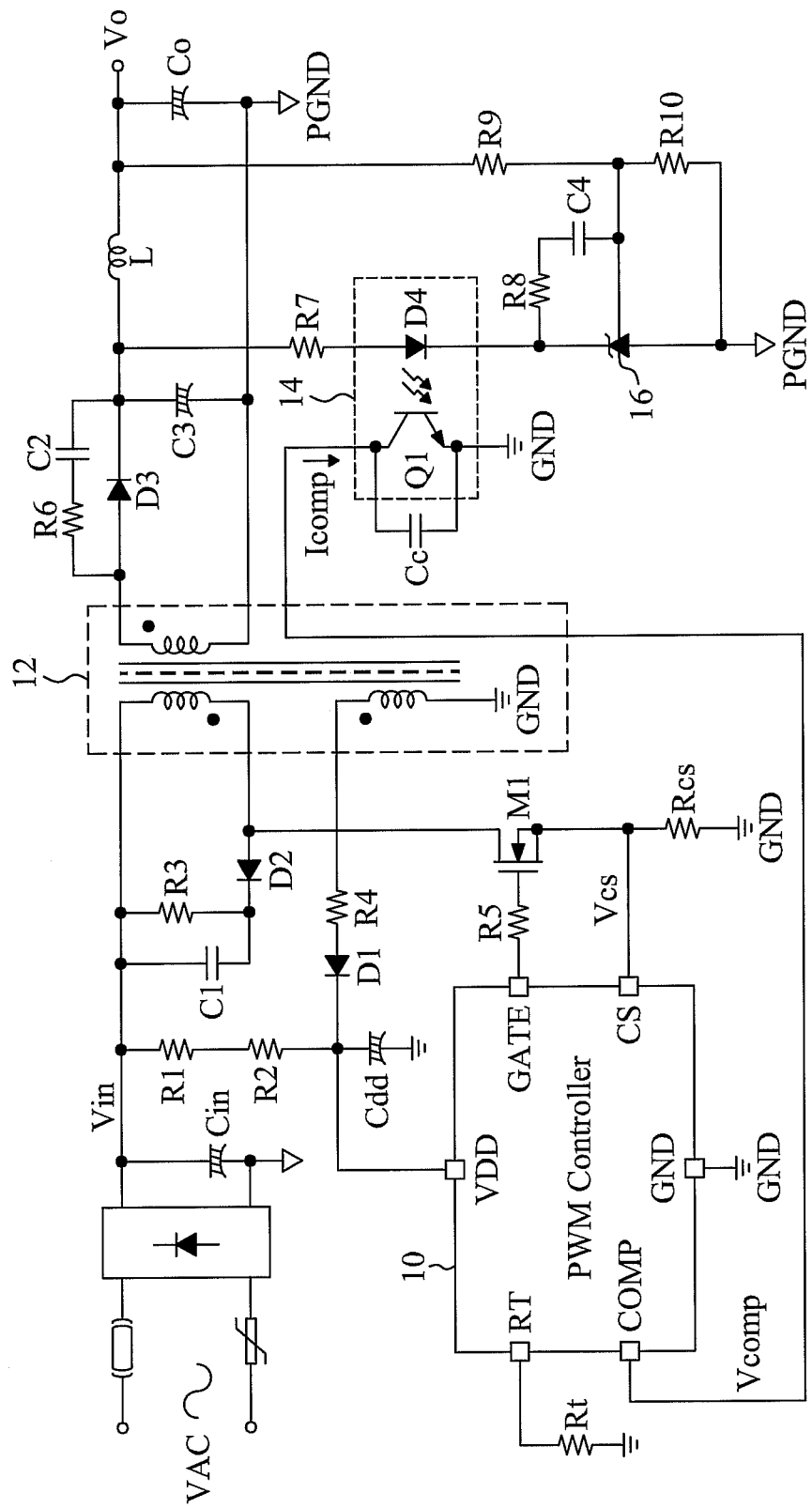
FIG. 1 is a circuit diagram of a conventional flyback power supply.
Figure 2:
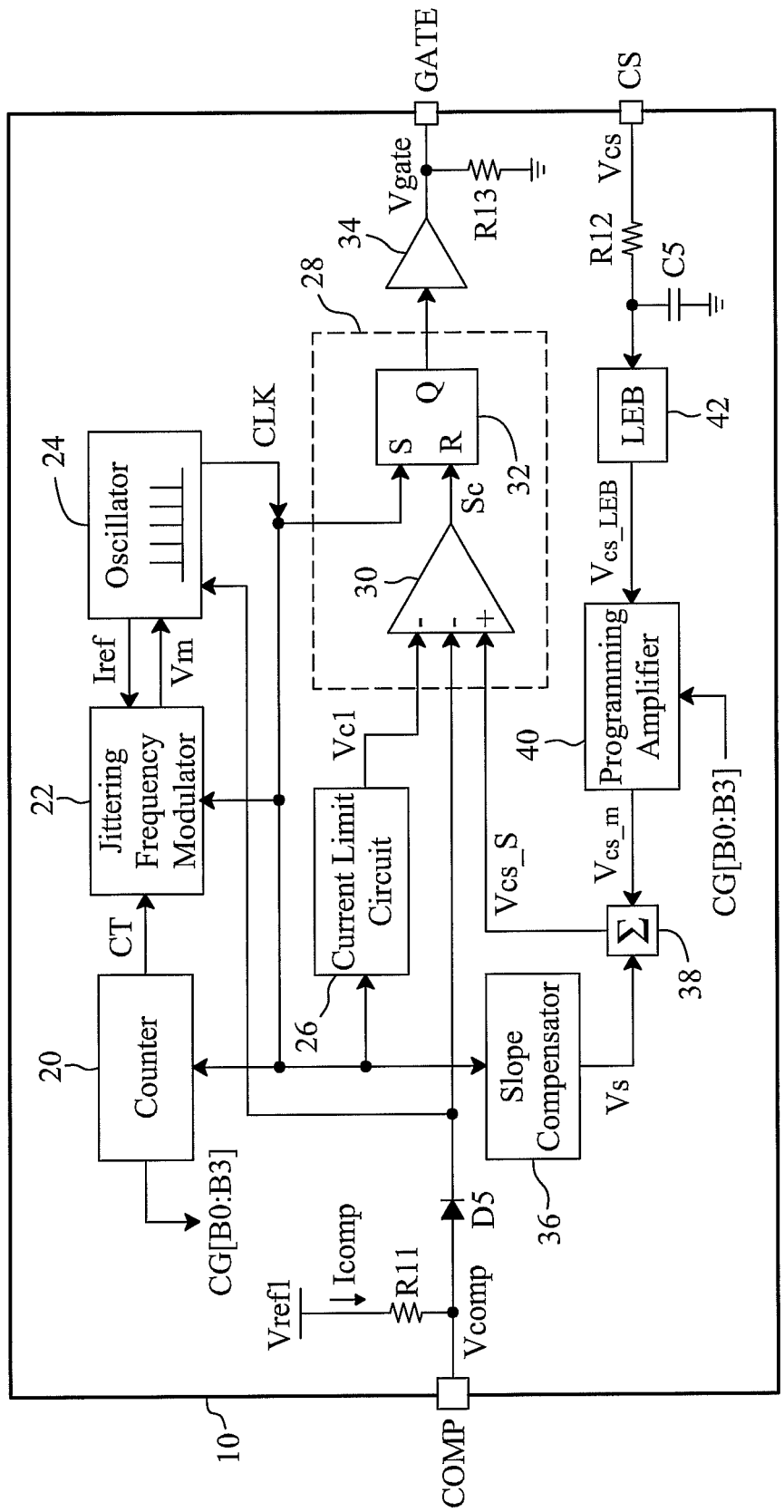
FIG. 2 is a circuit diagram of a first embodiment according to the present invention.

Referring to the PWM controller 10 shown in FIG. 2. As in the known PWM loops, an oscillator 24 provides a clock CLK, a pulse width modulator 28 generates a switch signal Q responsive to the clock CLK, a feedback voltage Vcomp and a current sense signal Vcs S, a gate driver 34 generates a switch signal Vgate according to the switch signal Q, and the switching frequency of the switch signal Vgate is equal to the frequency fs of the clock CLK. A counter 20 counts the clock CLK to generate a count value CT, and a jittering frequency modulator 22 provides a jittering frequency adjust signal Vm to the oscillator 24 according to the count value CT, the clock CLK and a reference signal Iref provided by the oscillator 24.

According to the feedback voltage Vcomp, the oscillator 24 controls the frequency fs of the clock CLK to vary with load. Also, the oscillator 24 determines a jittering frequency range of the clock CLK according to the jittering frequency adjust signal Vm. In the pulse width modulator 28, a comparator 30 generates a comparison signal Sc according to a current limit signal Vcl, the feedback voltage Vcomp and the current sense signal Vcs S, and an SR flip-flop 32 is triggered by the clock CLK and reset by the signal Sc, With the current limit signal Vcl and the feedback voltage Vcomp as thresholds to be compared with the current sense signal Vcs, the comparison signal Sc is generated. When the current sense signal Vcshd —S increases to one of the current limit signal Vcl and the feedback voltage Vcomp, the comparator 30 pulls high the comparison signal Sc, thereby resetting the flip-flop 32 to turn off the on-time Ton of the switch signal Q or Vgate. A resistor R11 is connected between a reference voltage source Vrefl and the pin COMP to generate the feedback voltage Vcomp. A leading-edge blocking circuit 42 masks the leading edge of the current sense signal Vcs to generate a current sense signal Vcs_LEB, a programming amplifier 40 amplifies the current sense signal Vcs_LEB into a current sense signal Vcs_m, an adder 38 adds the current sense signal Vcs_m and a compensate signal Vs provided by a slope compensator 36 to generate the current sense signal Vcs_S supplied to the pulse width modulator 28. While PWM loops may differ in design, their basic structure is as described above, i.e., with the pulse width modulator generating a switch signal on the basis of a clock and according to an output feedback signal and a current sense signal. The embodiment of FIG. 2 is a circuit designed only to illustrate the principles of the present invention; therefore, the present invention is by no means limited to that particular circuit alone. The equation Eq-1 shows that a variation in the switching frequency fs causes a variation in the output power Po and hence the occurrence of output ripple. In order to reduce output ripple, the on-time Ton can be decreased or increased with the increase or decrease of the switching frequency fs. In the embodiment of FIG. 2, the programming amplifier 40 is used in place of the conventional constant gain amplifier, and the gain of the programming amplifier 40 is changed by the count value CG provided by the counter 20 to change the on-time Ton. As the counter 20 generates the count value CG by counting the clock CLK, the gain of the programming amplifier 40 is changed according to the switching frequency fs. Thus, the on-time Ton varies inversely with variation of the switching frequency fs, and output ripple caused by the uttering frequency of the flyback power supply is reduced. More specifically, once the on-time Ton is triggered, the power switch M1 is turned on. Thereby, the current of the power switch M1 increases, the current sense signal Vcs extracted from this current increases, and so does the subsequently derived current sense signal Vcs_m. When the current sense signal Vcs_S, which is made up of the current sense signal Vcs_m and the constant slope compensate signal Vs, increases to the current limit signal Vcl or the feedback voltage Vcomp, the on-time Ton is turned off, thus turning off the power switch M1. Since the gain of the programming amplifier 40 varies with the frequency of the clock CLK, the gain of the current sense signal Vcs_m also varies with the frequency of the clock CLK. As a result, the on-time Ton varies with the frequency of the clock CLK, too. When the frequency of the clock CLK increases, the gain of the programming amplifier 40 increases, and so does the current sense signal Vcs_m. Because of that, the current sense signal Vcs_m will reach one of the current limit signal Vcl and the feedback voltage Vcomp sooner, thereby shortening the on-time Ton. Conversely, when the frequency of the clock CLK decreases, the gain of the programming amplifier 40 is decreased, and the on-time Ton is extended as a result.

Figure 3:
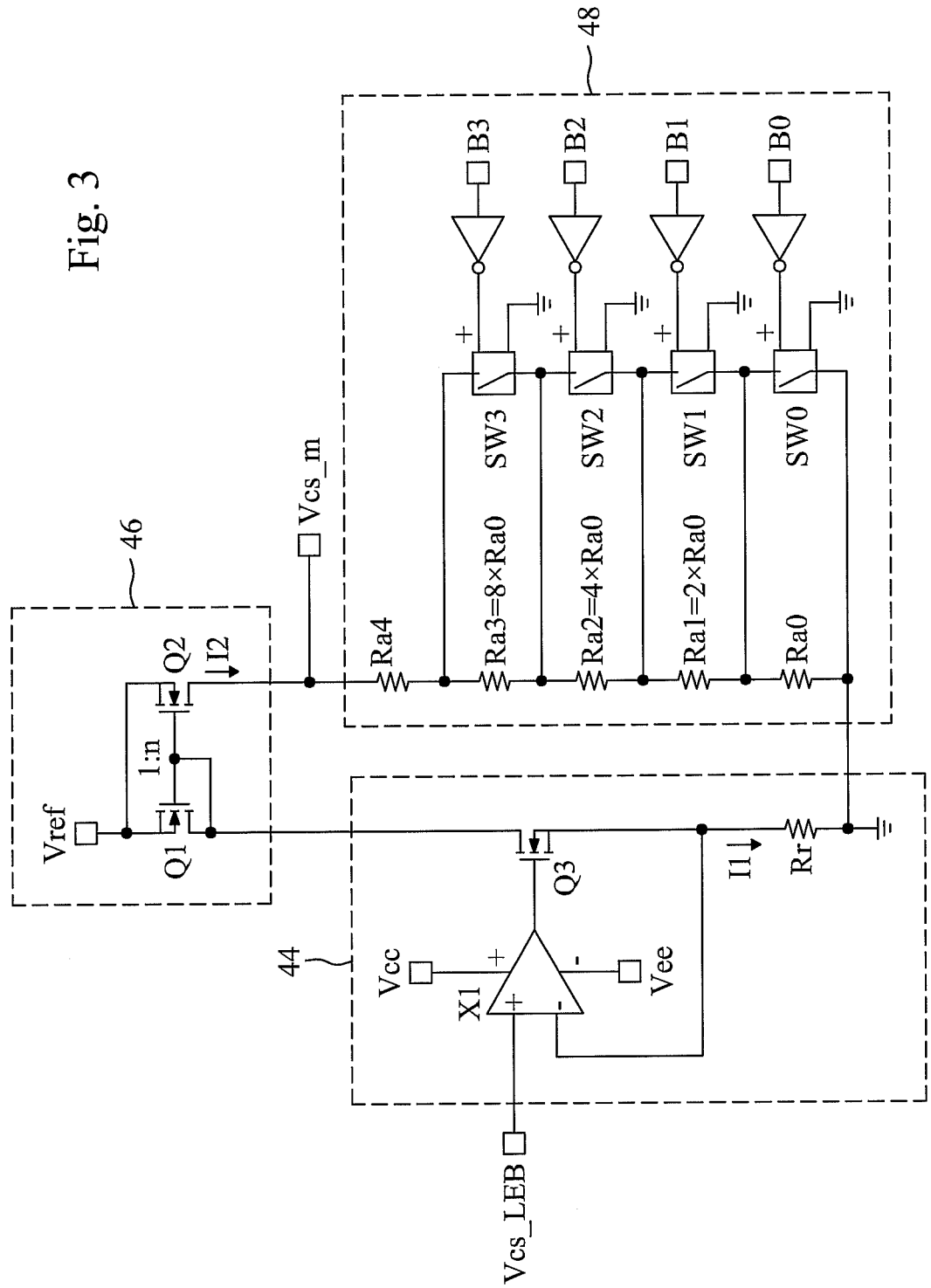
FIG. 3 is a circuit diagram of an embodiment for the programming amplifier shown in FIG. 2.

FIG. 3 is a circuit diagram of an embodiment for the programming amplifier 40 shown in FIG. 2, which includes a voltage-to-current converter 44 to convert the current sense signal Vcs_LEB into a current I1, a current mirror 46 to mirror the current I1 to generate a current I2, and a variable resistor 48 to generate the current sense signal Vcs_m according to the current I2. The variable resistor 48 includes the serially connected resistors Ra0, Ra1, Ra2, Ra3, and Ra4 and the switches SW0, SW1, SW2, and SW3, the switch SW0 is shunt to the resistor Ra0, the switch SW1 is shunt to the resistor Ra1, the switch SW2 is shunt to the resistor Ra2, and the switch SW3 is shunt to the resistor Ra3. The count value CG includes bits B0, B1, B2, and B3 to control the switches SW0, SW1, SW2, and SW3, respectively, thereby determining the resistance of the variable resistor 48. The current sense signal Vcs_m can be expressed by $Vcs\_m = (n \times Ra/Rr) \times Vcs\_LEB$, where n is the size ratio of the transistors Q1 and Q2 in the current mirror 44, Ra is the resistance of the variable resistor 48, and $n \times Ra/Rr$ is the gain of the programming amplifier 40. By varying the resistance Ra of the variable resistor 48, the gain of the programming amplifier 40 is changed.

Figure 4:
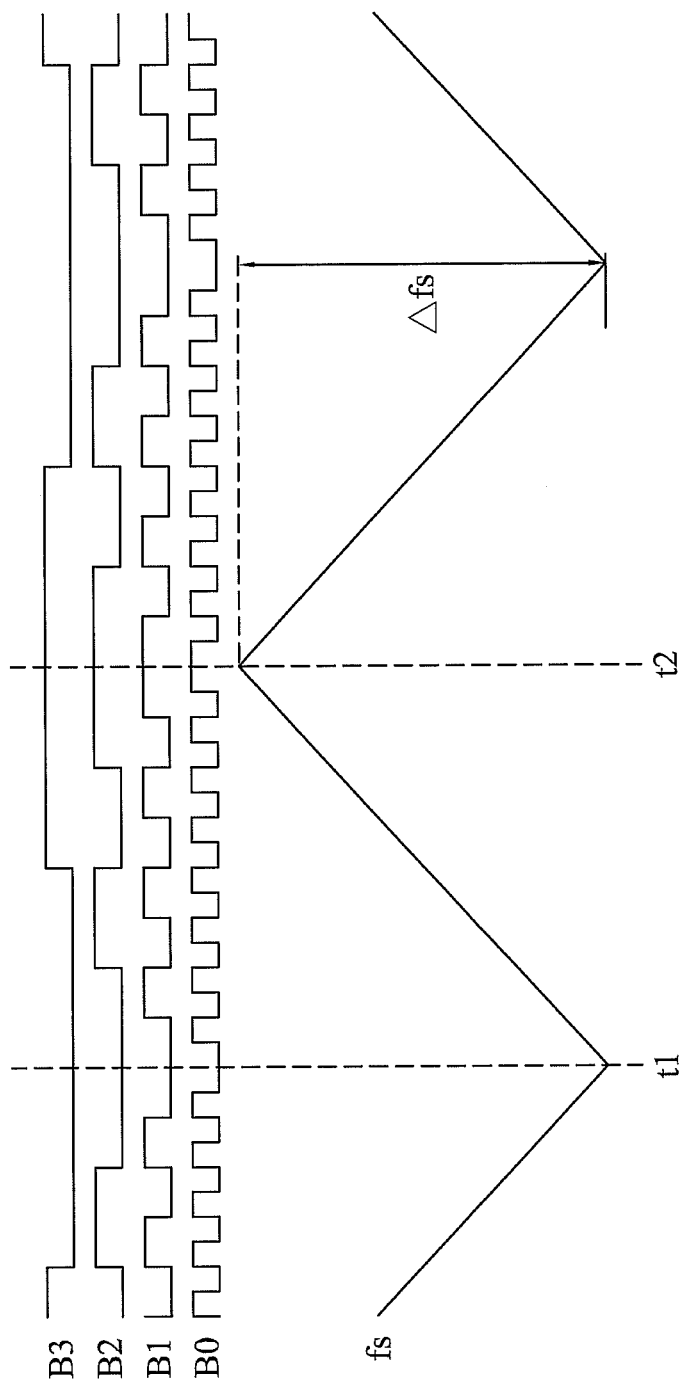
FIG. 4 is a timing diagram of the count value and the switching frequency shown in FIG. 2.

FIG. 4 is a timing diagram of the bits B0, B1, B2 and B3 and of the switching frequency fs. When the switching frequency fs is at the minimum, as shown at time t1, all the signals B0, B1, B2 and B3 are low. In consequence, the switches SW0, SW1, SW2 and SW3 shown in FIG. 3 are turned on, bringing the resistance Ra of the variable resistor 48 to its minimum, i.e. Ra=Ra4, and therefore the gain of the programming amplifier 40 reaches its minimum. As the switching frequency fs increases, the resistance Ra of the variable resistor 48 also increases, thus increasing the gain of the programming amplifier 40. When the switching frequency fs reaches its maximum, as shown at time t2, all the signals B0, B1, B2 and B3 are high. As a result, the switches SW0, SW1, SW2 and SW3 shown in FIG. 3 are turned off, the resistance Ra of the variable resistor 48 comes to its maximum, i.e. Ra=Ra0+Ra1+Ra2+Ra3+Ra4, and hence the gain of the programming amplifier 40 reaches its maximum. Afterward, the resistance Ra of the variable resistor 48 decreases with the switching frequency fs, and the gain of the programming amplifier 40 decreases with the resistance Ra.

Figure 5:
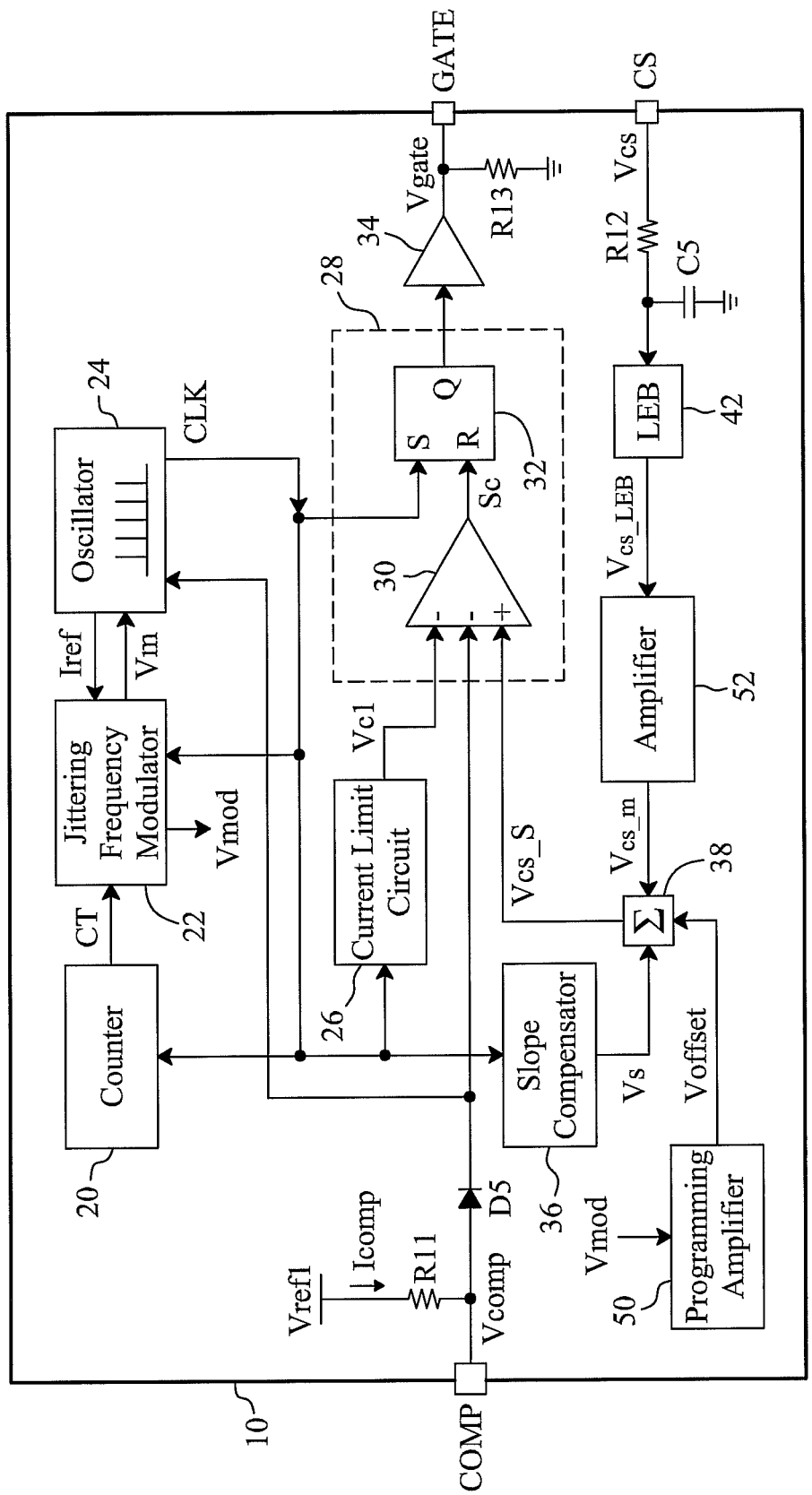
FIG. 5 is a circuit diagram of a second embodiment according to the present invention.
Figure 6:
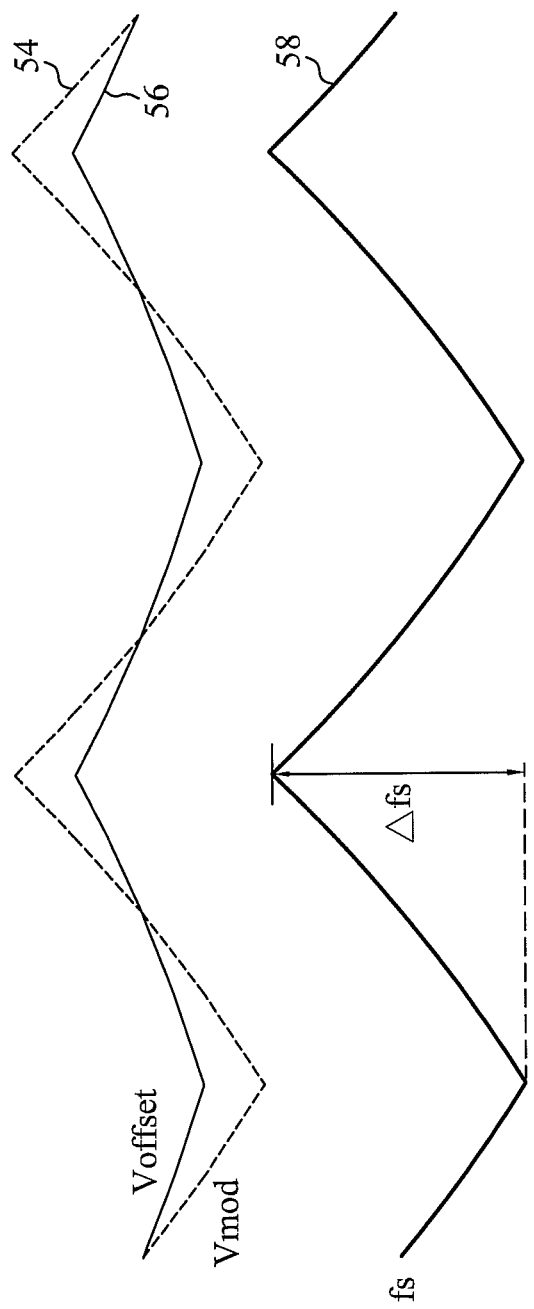
FIG. 6 is a waveform diagram of the modulate signal, the offset signal and the switching frequency shown in FIG. 5.

In the embodiment of FIG. 2, the on-time is changed by varying the gain of the current sense signal. In the embodiment of FIG. 5, however, the on-time is changed by varying the level of the current sense signal. To illustrate the latter approach, the embodiment of FIG. 5 is designed on the same basis as that of FIG. 2, and all the circuits are the same except for those of the jittering frequency modulator 22 and the programming amplifier 50. As shown in FIG. 5, the current sense signal Vcs_LEB is amplified into the current sense signal Vcs_m by a constant gain amplifier 52. Referring to FIG. 6 in conjunction with FIG. 5, the jittering frequency modulator 22 counts the clock CLK to generate a modulate signal Vmod proportional to the switching frequency fs, as shown by the waveforms 54 and 58, respectively. The modulate signal Vmod is supplied to the programming amplifier 50, the programming amplifier 50 converts the modulate signal Vmod into an offset signal Voffset proportional to the switching frequency fs, as shown by the waveform 56, and the offset signal Voffset shifts the sum of the current sense signal Vcs_m and the compensate signal Vs upward or downward to change the on-time Ton. When the switching frequency fs increases, the offset signal Voffset increases, thereby shifting the level of the current sense signal Vcs_S upward. As a result, the current sense signal Vcs_S will reach the current limit signal Vc1 or the feedback voltage Vcomp sooner, resulting in a shorter on-time Ton. When the switching frequency fs decreases, the offset signal Voffset is lowered to shift the level of the current sense signal Vcs_S downward, thereby extending the on-time Ton.

As demonstrated by the foregoing embodiments, output ripple reduction can be achieved simply by means of the counter, the jittering frequency modulator and the programming amplifier, without modifications in design of the PWM control circuit. Therefore, the solution proposed by the present invention is applicable to a variety of PWM controllers.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A pulse width modulation (PWM) controller for output ripple reduction of a jittering frequency switching power supply, for providing a switch signal to switch a power switch of the switching power supply, the PWM controller comprising:
    an oscillator providing a clock having a jittering frequency to determine a switching frequency of the switch signal;
    a programming amplifier amplifying a current sense signal extracted from a current of the power switch; and
    a counter connected to the oscillator and the programming amplifier, counting the clock to generate a count value to adjust a gain of the programming amplifier to adjust an on-time of the switch signal.

2. The PWM controller of claim 1, wherein the programming amplifier comprises:
    a voltage-to-current converter converting the current sense signal into a first current;
    a variable resistor having a resistance adjustable in response to the count value; and
    a current mirror connected to the voltage-to-current converter and the variable resistor, mirroring the first current to generate a second current to the variable resistor to generate an amplified current sense signal.

3. A pulse width modulation (PWM) method for output ripple reduction of a jittering frequency switching power supply, for providing a switch signal to switch a power switch of the switching power supply, the PWM method comprising steps of:
    generating the switch signal on basis of a clock having a jittering frequency and according to a current sense signal extracted from a current of the power switch;
    counting the clock to generate a count value; and
    adjusting a gain of the current sense signal according to the count value to adjust an on-time of the switch signal.

4. A pulse width modulation (PWM) controller for output ripple reduction of a jittering frequency switching power supply, for providing a switch signal to switch a power switch of the switching power supply, the PWM controller comprising:
    an oscillator providing a clock having a jittering frequency to determine a switching frequency of the switch signal;
    a jittering frequency modulator connected to the oscillator, operative to count the clock to generate a modulate signal;
    a programming amplifier connected to the jittering frequency modulator, amplifying the modulate signal to generate an offset signal; and
    an adder connected to the programming amplifier, responsive to the offset signal to shift a level of a current sense signal extracted from a current of the power switch to adjust an on-time of the switch signal.

5. A pulse width modulation (PWM) method for output ripple reduction of a jittering frequency switching power supply, for providing a switch signal to switch a power switch of the switching power supply, the PWM method comprising steps of:
    generating the switch signal on basis of a clock having a jittering frequency and according to a current sense signal extracted from a current of the power switch;
    counting the clock to generate a modulate signal;
    generating an offset signal according to the modulate signal; and
    shifting a level of the current sense signal according to the offset signal to adjust an on-time of the switch signal.

* * * * *